(12) United States Patent
Chowdhury et al.

(10) Patent No.: US 11,375,144 B2
(45) Date of Patent: Jun. 28, 2022

(54) METHOD AND SYSTEM FOR REDUCING THERMAL SHADING IN IMAGE SENSOR USING ON CHIP LOCALIZED HEAT SOURCE

(71) Applicant: SAMSUNG ELECTRONICS CO., LTD., Suwon-si (KR)

(72) Inventors: Ankush Chowdhury, Bangalore (IN); Ramana Babu Lalam, Bangalore (IN); Prashant Govindlal Rupapara, Bangalore (IN); Rohan Anand, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/994,294

(22) Filed: Aug. 14, 2020

(65) Prior Publication Data

US 2021/0051289 A1 Feb. 18, 2021

(30) Foreign Application Priority Data

Aug. 17, 2019 (IN) .............................. 201941033238

(51) Int. Cl.
| | |
|---|---|
| *H04N 5/374* | (2011.01) |
| *H04N 5/365* | (2011.01) |
| *H04N 5/361* | (2011.01) |
| *G01J 5/20* | (2006.01) |
| *G02B 6/02* | (2006.01) |
| *G03B 21/53* | (2006.01) |
| *H05B 1/02* | (2006.01) |

(Continued)

(52) U.S. Cl.
CPC ................................ *H04N 5/3745* (2013.01)

(58) Field of Classification Search
CPC ...... H04N 5/3572; H04N 5/335; H04N 5/361; H04N 5/365; H04N 5/3651; H04N 5/3653; H04N 5/3745; H04N 1/00986; H04N 1/00978; H04N 1/6091; G02B 6/02204; G03B 21/206; G06F 1/206; H01L 23/345; H01L 23/34; H01L 2225/1095; H05B 1/02; H01H 37/00
USPC ..... 348/294, 308, 241, 243, 533; 250/208.1, 250/316.1, 317.1, 318, 443.1; 257/276, 257/675, 706, 720
See application file for complete search history.

(56) References Cited

U.S. PATENT DOCUMENTS

| | | | |
|---|---|---|---|
| 9,282,259 B2 * | 3/2016 | Johnson | ................... H04N 5/33 |
| 9,318,528 B2 | 4/2016 | Huang et al. | |
| 10,451,487 B1 * | 10/2019 | Kennedy | ................... G01J 5/20 |

(Continued)

FOREIGN PATENT DOCUMENTS

WO 2015/157374 A1 10/2015

*Primary Examiner* — Marly S Camargo
(74) *Attorney, Agent, or Firm* — Sughrue Mion, PLLC

(57) ABSTRACT

A method for reducing thermal shading in a complementary metal-oxide-semiconductor (CMOS) image sensor is provided. The method includes: detecting one or more regions in a CMOS image sensor in which thermal shading occurs, the CMOS image sensor including a plurality of heating elements in a chip; automatically switching a subset of the plurality of heating elements to turn on based on the detected one or more regions; and automatically switching the subset of the plurality of heating elements to turn off in an active power consumption phase of the CMOS image sensor.

18 Claims, 5 Drawing Sheets
(2 of 5 Drawing Sheet(s) Filed in Color)

(51) Int. Cl.
  *H01H 37/00*   (2006.01)
  *H04N 5/3745*   (2011.01)

(56) References Cited

U.S. PATENT DOCUMENTS

| | | |
|---|---|---|
| 2011/0089517 A1 | 4/2011 | Venezia et al. |
| 2013/0218500 A1* | 8/2013 | Durand .................... G01J 5/24 |
| | | 702/87 |
| 2019/0089872 A1* | 3/2019 | Rukes .................... H04N 5/225 |

* cited by examiner

METHOD AND SYSTEM FOR REDUCING THERMAL SHADING IN IMAGE SENSOR USING ON CHIP LOCALIZED HEAT SOURCE

CROSS-REFERENCE TO RELATED APPLICATION

This application claims priority to India Patent Application No. 2019-41033238, filed on Aug. 17, 2019, in the India Intellectual Property Office, the disclosure of which is herein incorporated by reference in its entirety.

BACKGROUND

1. Field

Embodiments of the disclosure relate to an image sensor, and more particularly, to an image sensor having a plurality of pixels arranged in rows and columns for use in, for example, camera mobile phones, automotive image sensors, surveillance image sensors and any complementary metal-oxide-semiconductor (CMOS) image sensor to reduce thermal dark shading.

2. Description of Related Art

In an image sensor, each light receiving element outputs a signal having an integrated light component and an integrated dark current component. A dark current is an undesirable current that integrates as charge in a photodiode of pixels in a complementary metal-oxide-semiconductor (CMOS) image sensor and is temperature dependent. Due to a large size of the image sensor and uneven power consumption density, the temperature across an image sensor chip may not be uniform which leads to non-uniform dark current across the chip. The accumulated charge due to the dark current on each pixel leads to an offset in a pixel signal voltage. This leads to dark shading (or thermal shading), in which shading of a dark image is caused by an uneven offset resulting from uneven dark currents in the pixels across a pixel array in the image sensor. The dark shading results in a shading pattern in an image which is visible in low light conditions.

Thus, there is a need for a solution that overcomes the above-mentioned problems.

SUMMARY

This summary is provided to introduce a selection of concepts in a simplified format that is further described in the detailed description of the disclosure. This summary is not intended to identify key or essential inventive concepts of the disclosure, nor is it intended for determining the scope of the disclosure.

According to an aspect of an example embodiment, provided is a method for reducing thermal shading in a complementary metal-oxide-semiconductor (CMOS) image sensor, the method including: detecting one or more regions in a CMOS image sensor in which thermal shading occurs, the CMOS image sensor including a plurality of heating elements in a chip; automatically switching a subset of the plurality of heating elements to turn on based on the detected one or more regions; and automatically switching the subset of the plurality of heating elements to turn off in an active power consumption phase of the CMOS image sensor.

According to an aspect of an example embodiment, provided is a system for reducing thermal shading in a complementary metal-oxide-semiconductor (CMOS) image sensor, the system including: a CMOS image sensor, the CMOS image sensor including a plurality of heating elements in a chip and a detector; and a controller associated with the CMOS image sensor and configured to: automatically switch a subset of the plurality of heating elements based on a determination that thermal shading occurs; and automatically switch the subset of the plurality of heating elements to turn off in an active power consumption phase of the CMOS image sensor.

BRIEF DESCRIPTION OF THE DRAWINGS

The patent or application file contains at least one drawing executed in color. Copies of this patent or patent application publication with color drawings will be provided by the Office upon request and payment of the necessary fee. The above and other aspects, features, and advantages of certain example embodiments of the disclosure will be more apparent from the following description taken in conjunction with the accompanying drawings, in which.

DETAILED DESCRIPTION

Figure 1:
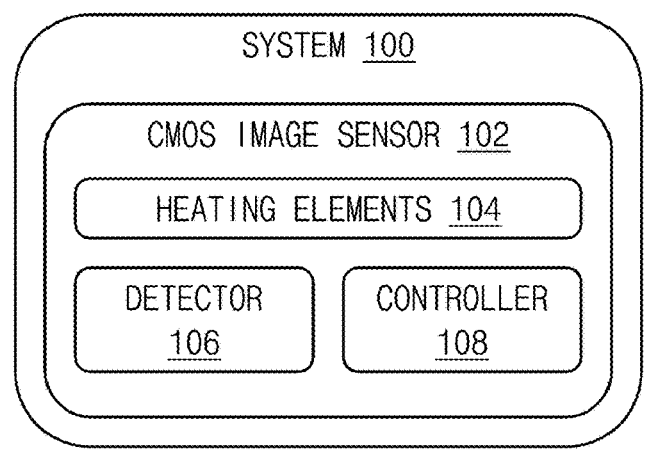
FIG. 1 illustrates a schematic block diagram of a system for thermal dark shading reduction in a complementary metal-oxide-semiconductor (CMOS) image sensor, in accordance with an example embodiment.

For the purpose of promoting an understanding of the principles of the disclosure, reference will now be made to the embodiment illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art related to the disclosure.

It will be understood by those skilled in the art that the foregoing general description and the following detailed description are explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises ... a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this disclosure belongs. The system, methods, and examples provided herein are illustrative only and not intended to be limiting.

Example embodiments of the disclosure will be described below in detail with reference to the accompanying drawings.

FIG. 1 illustrates a schematic block diagram of a system 100 for thermal dark shading (or thermal shading or dark shading) reduction in a complementary metal-oxide-semiconductor (CMOS) image sensor, in accordance with an example embodiment.

In an example embodiment, the system 100 may be configured to reduce thermal dark shading in a CMOS image sensor 102 by embedding a plurality of heating elements 104 in the CMOS image sensor 102. As a result, the problem of dark shading due to non-uniform temperature across an image sensor chip is solved. In an example, the system 100 may be implemented in mobile phones equipped with a camera, automotive image sensors, surveillance image sensors, and any large CMOS image sensor of higher resolution and/or large die size, etc.

In an example embodiment, the system 100 includes the CMOS image sensor 102, the plurality of heating elements 104, and a controller 108. The system 100 may also include a detector 106. Although it is described in FIG. 1 that the detector 106 and the controller 108 are included in the CMOS image sensor 102, but the disclosure is not limited thereto, and the detector 106 and the controller 108 may be provided separate from the CMS image sensor 102 and are electrically connected with the CMOS image sensor 102.

Figure 2:
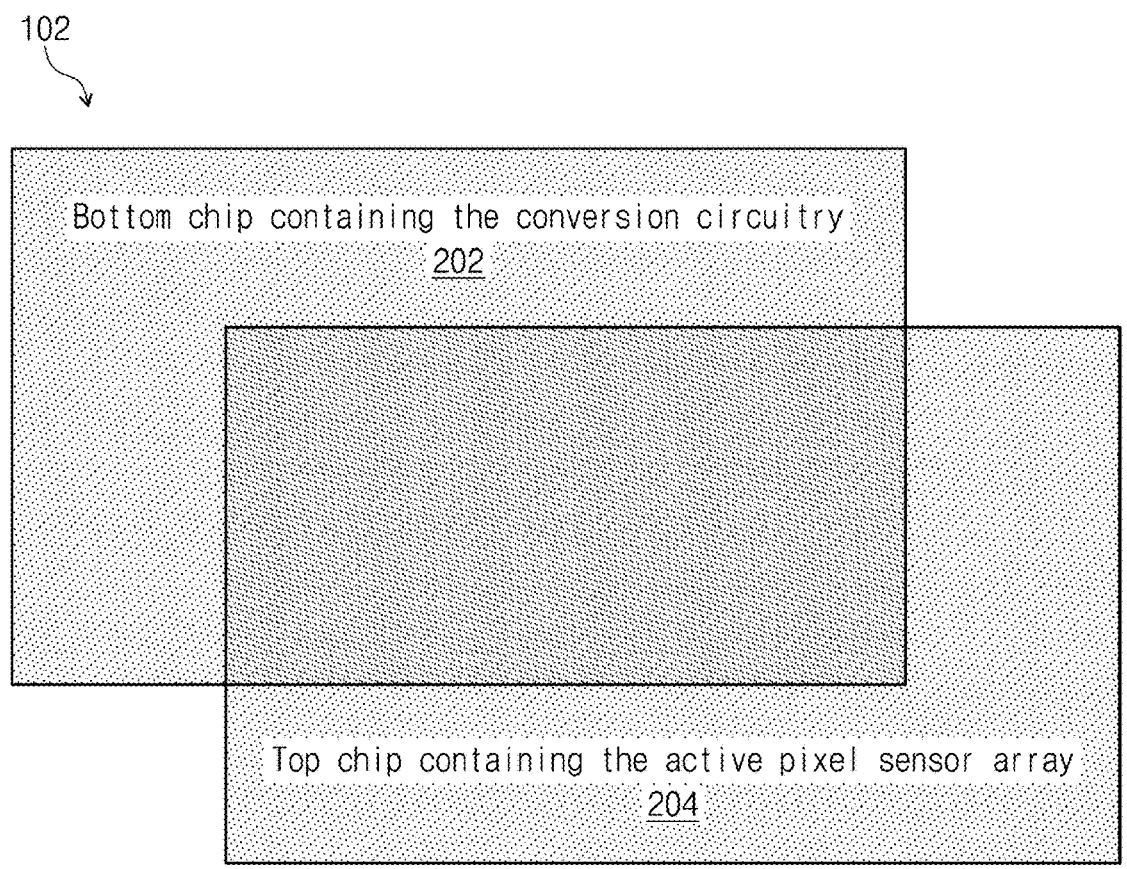
FIG. 2 illustrates a schematic block diagram illustrating a configuration of a CMOS image sensor array, in accordance with an example embodiment.

In an example, the CMOS image sensor 102 may be configured to capture an image. In an embodiment, the CMOS image sensor 102 may be a one chip sensor, or a three-dimensional (3D) image sensor in which two or more chips are stacked. For example, FIG. 2 illustrates an example in which two chips are stacked to provide a 3D image sensor 102. Referring to FIG. 2, the CMOS image sensor 102 may include a top chip 204 and a bottom chip 202 which are connected to each other (e.g., glued together).

In an example embodiment, the top chip 204 of the CMOS image sensor 102 includes an array of active pixel sensor elements such as photodiodes, which convert photon signals to an electrical signal.

In an example embodiment, the bottom chip 202 of the CMOS image sensor 102 contains a conversion circuitry which converts the electrical signal to a digital signal. The bottom chip 202 may include the plurality of heating elements 104, the detector 106, and the controller 108.

Figure 3:
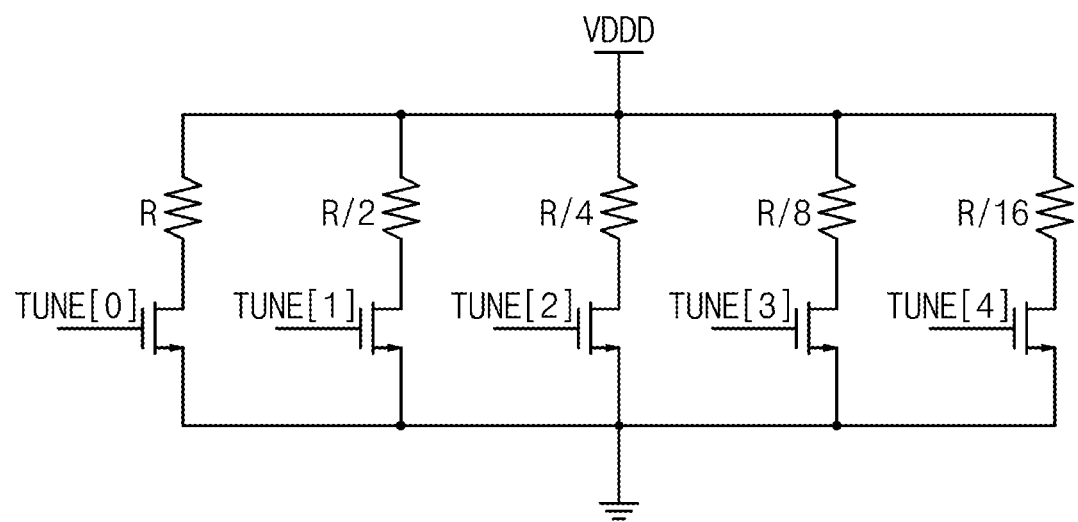
FIG. 3 illustrates a circuit diagram of heating elements, in accordance with an example embodiment.

In the bottom chip 202, the plurality of heating elements 104 may be implemented in a form of a circuit, as shown in FIG. 3. For example, each of the plurality of heating elements 104 may include a resistor and a metal-oxide-semiconductor field-effect transistor (MOSFET). Referring to FIG. 3, the plurality of heating elements 104 may include a resistor and a negative-channel metal-oxide semiconductor (NMOS) transistor serially connected to the resistor between a power supply (e.g., VDDD) and ground of the chip, and a plurality of branches of a resistor and an NMOS transistor are connected in parallel between the power supply and the ground.

In an embodiment, the NMOS transistor may be configured to act as a switching element in each branch of a resistor and an NMOS transistor of the plurality of heating elements 104. Therefore, each of the plurality of heating elements 104 is controllable to be switched ON/OFF by the controller 108 by switching ON/OFF the NMOS transistor of each branch. For example, one branch (e.g. a branch including R2) may be activated and another branch (e.g. a branch including R4) may be switched-off by selectively switching an NMOS. Accordingly, heat generation of the plurality of heating elements 104 may be controlled.

The power consumption of the plurality of heating elements 104 may be expressed as shown below, assuming that a voltage drop across the NMOS transistors is negligible:

$$\frac{VDDD^2}{\left(TUNE[0]*R \parallel TUNE[1]* \atop \frac{R}{2} \parallel TUNE[2]*\frac{R}{4} \parallel TUNE[3]*\frac{R}{8} \parallel TUNE[4]*\frac{R}{16}\right)}$$

The plurality of heating elements 104 may be scattered across the conversion circuitry in the bottom chip 202 to balance thermal gradient in the bottom chip 202. The thermal gradient in the bottom chip 202 of the image sensor 102 affects photosensitive elements in the top chip 204.

Further, instead of a resistor ladder and an NMOS switch ON/OFF, the plurality of heating elements 104 may also be implemented via various power consuming blocks such as an inverter chain, a ring oscillator or any power consuming block within a small area to produce localized heating.

The detector 106 may be embedded in the bottom chip 202 of the image sensor 102 and may be configured to detect one or more regions across the CMOS image sensor 102 in which thermal shading occurs under low light conditions. In an embodiment, the system may embed the detector 106 in the bottom chip 202. In another embodiment, the system 100, during the testing of the bottom chip 202, may detect the one or more regions across the CMOS image sensor 102 in which thermal shading occurs under low light conditions and store information related to this detection. The information may be used in switching ON/OFF a subset of the plurality of heating elements 104 to provide localized heating within the CMOS image sensor.

In an example embodiment, the controller 108 is linked to (or associated with) the image sensor 102 and the detector 106. The controller 108 may be configured to automatically switch ON a subset of the plurality of heating elements 104 to provide localized heating within a region of the CMOS image sensor 102 in which thermal shading occurs under low light image capturing conditions. The controller 108 may be configured to automatically switch OFF the subset of heating elements 104 during an active power consumption phase of the CMOS image sensor 102. The controller 108 may be implemented by a processor such as a micro control unit (MCU) or a central processing unit (CPU), firmware, or a hardware logic such as a field programmable gate array (FPGA), or any combination thereof.

Figure 4:
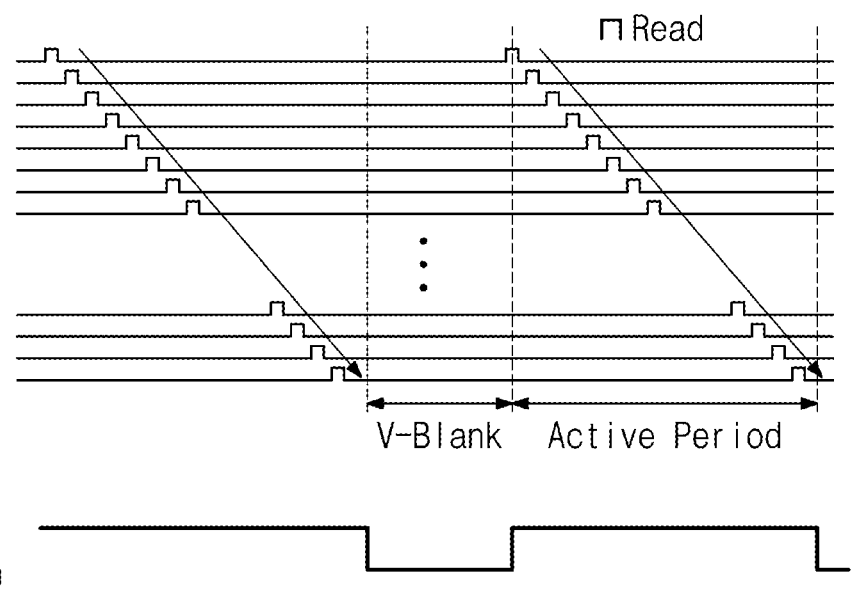
FIG. 4 illustrates power consumption of the heating elements, in accordance with an example embodiment.
Figure 5:
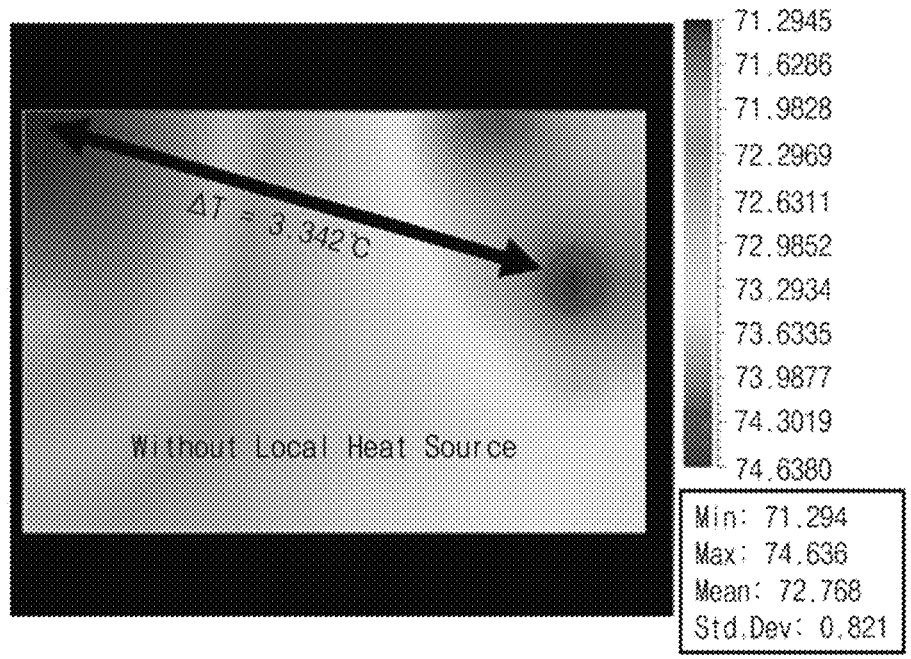
FIG. 5 illustrates a temperature difference in a chip without heating elements.
Figure 6:
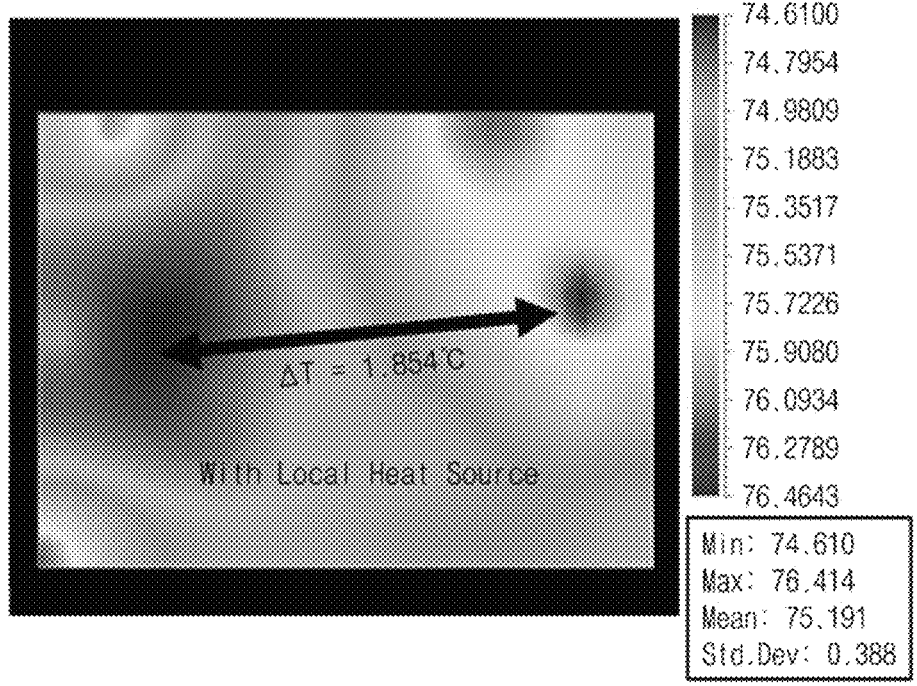
FIG. 6 illustrates a temperature difference in a chip including heating elements, in accordance with an example embodiment.

FIG. 4 illustrates the power consumption of the CMOS image sensor 102 during an active period (or an active power consumption phase) and a low power phase, in accordance with an example embodiment. The subset of the heating elements 104 may be controlled to be switched on or off according to the requirement in the CMOS image sensor 102. For example, the subset of the heating elements 104 may be switched on during the low power phase of the sensor operation (e.g., vertical-blank phase). Under the low light condition, the low power phase of the CMOS image sensor 102 may enable higher light capture, and therefore, driving the subset of the plurality of heating elements 104 may not increase power consumption during a highest power consumption mode (e.g., bright light conditions). FIG. 5 shows a temperature difference in a chip without the heating elements 104, and FIG. 6 shows a temperature difference in a chip with the heating elements 104, in accordance with an example embodiment.

Figure 7:
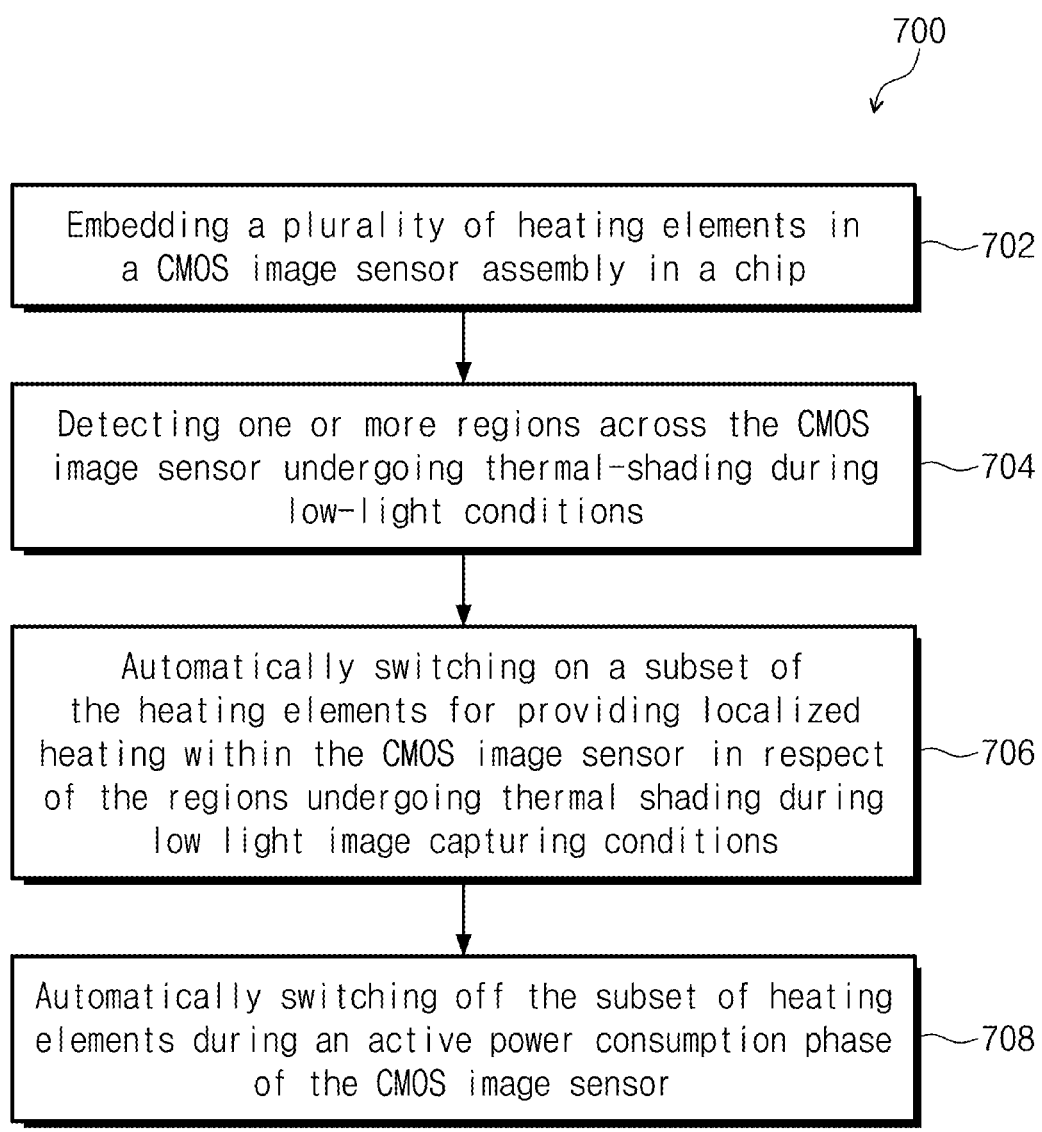
FIG. 7 illustrates a flow chart illustrating a method for thermal dark shading reduction in a CMOS image sensor, in accordance with an example embodiment.

FIG. 7 illustrates a flow chart illustrating a method 700 for thermal dark shading reduction in a CMOS image sensor, in accordance with an example embodiment. For the sake of brevity, features of the disclosure that are explained in detail in the description of FIGS. 1-6 are not explained in detail in the description of FIG. 7.

At a block 702, the method 700 includes embedding a plurality of heating elements in a CMOS image sensor in a chip. In the method 700, embedding includes generating a map of the plurality of heating elements in the chip. In the method, embedding further includes enabling a control for switching ON of the one or more heating elements from the plurality of heating elements with respect to the detected thermal dark shading region. For example, enabling a control for switching ON of the one or more heating elements may be performed by referring to the map of the plurality of heating elements.

At a block 704, the method 700 includes detecting one or more regions across the CMOS image sensor in which thermal shading occurs under low light conditions. In an example embodiment, the detector 106 may be configured to detect one or more regions across the CMOS image sensor undergoing thermal shading during low light conditions In an example embodiment, the detecting of the thermal dark shading region across the CMOS image sensor includes at least one selected from scattering a plurality of temperature sensors across the chip to detect a temperature difference across the chip, and capturing a dark image to detect the thermal dark shading region across the CMOS image sensor. Further, detecting the thermal dark shading region across the CMOS image sensor may also include processing images of the CMOS image sensor to detect the thermal dark shading region using artificial intelligence (AI) and/or machine learning.

At a block 706, the method 700 includes automatically switching ON a subset of the heating elements for providing localized heating within the CMOS image sensor based on the one or more regions undergoing thermal shading under low light image capturing conditions. At a block 708, the method 700 includes automatically switching OFF the subset of heating elements during an active power consumption phase of the CMOS image sensor. In an example embodiment, the controller 108 may be configured to automatically switch ON a subset of the heating elements for providing localized heating within the CMOS image sensor based on the regions undergoing thermal shading during low light image capturing conditions and automatically switch OFF the subset of heating elements during an active power consumption phase of the CMOS image sensor. In an embodiment, localized heating is triggered by power consumption due to the thermal resistance.

Benefits, other advantages, and solutions to problems have been described above with regard to example embodiments. However, the benefits, advantages, solutions to problems and any component(s) that may cause any benefit, advantage, or solution to occur or become more pronounced are not to be construed as a critical, required, or essential feature or component of any or all the claims.

At least by virtue of the various example embodiments, the disclosure achieves at least leads to the following advantages:

1. Each heating element uses a very small area;
2. Power consumption of each heating element is programmable;
3. A circuit of each heating element is based on already available components in a fabrication process;
4. It is easy to integrate multiple instances across an electronic device to enable correction of any dark shading profile; and
5. There is no impact on power consumption in a highest power consumption mode.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing steps may employ any number of related art techniques for electronics configuration, signal processing and/or control, data processing and the like.

While the inventive concept has been particularly shown and described with reference to example embodiments thereof, it will be understood that various changes in form and details may be made therein without departing from the spirit and scope of the following claims.

What is claimed:

1. A method for reducing thermal shading in a complementary metal-oxide-semiconductor (CMOS) image sensor, the method comprising:

detecting one or more regions in a CMOS image sensor in which thermal shading occurs, the CMOS image sensor comprising a plurality of heating elements in a chip;

based on the detected one or more regions, automatically switching a subset of the plurality of heating elements to turn on to provide localized heating; and automatically switching the subset of the plurality of heating elements to turn off in an active power consumption phase of the CMOS image sensor.

2. The method as claimed in claim 1, wherein the automatically switching the subset of the plurality of heating elements to turn on comprises:

generating a map of the plurality of heating elements in the chip; and controlling switching of the subset of the plurality of heating elements based on the detected one or more regions and further based on the map.

3. The method as claimed in claim 1, wherein the detecting comprises at least one of:

detecting a temperature difference across the chip by using a plurality of temperature sensors;

detecting the one or more regions in which the thermal shading occurs based on a dark image that is captured; or detecting the one or more regions in which the thermal shading occurs by processing images captured by the CMOS image sensor using an artificial intelligence (AI) and/or machine learning.

4. The method as claimed in claim 1, wherein each of the plurality of heating elements comprises a resistor and a transistor connected to the resistor in series between a power supply and ground.

5. The method as claimed in claim 1, wherein the automatically switching the subset of the plurality of heating elements to turn on is triggered in response to power consumption due to thermal resistance.

6. The method as claimed in claim 4, wherein the plurality of heating elements comprise a parallel connection of a plurality of branches, each of the plurality of branches comprising a resistor and a transistor connected to the resistor in series.

7. The method as claimed in claim 4, wherein the transistor is a metal-oxide-semiconductor field-effect transistor (MOSFET), and switching of each of the plurality of heating elements is controllable by switching the MOSFET included in each of the plurality of heating elements.

8. The method as claimed in claim 1, wherein the plurality of heating elements further comprises a power consuming block comprising at least one of an inverter chain or a ring oscillator.

9. A system for reducing thermal shading in a complementary metal-oxide-semiconductor (CMOS) image sensor, the system comprising:

a CMOS image sensor, the CMOS image sensor including a plurality of heating elements in a chip and a detector; and a controller associated with the CMOS image sensor and configured to:

based on a determination that thermal shading occurs, automatically switch a subset of the plurality of heating elements to turn on to provide localized heating; and automatically switch the subset of the plurality of heating elements to turn off in an active power consumption phase of the CMOS image sensor.

10. The system as claimed in claim 9, wherein the detector is configured to detect one or more regions in the CMOS image sensor in which the thermal shading occurs.

11. The system as claimed in claim 10, wherein the controller is further configured to automatically switch the subset of the plurality of heating elements to turn on based on the one or more regions detected by the detector.

12. The system as claimed in claim 9, wherein the controller is further configured to generate a map of the plurality of heating elements in the chip, and control switching of the subset of the plurality of heating elements based on the detected one or more regions and further based on the map.

13. The system as claimed in claim 9, wherein the detecting comprises at least one of:

detecting a temperature difference across the chip by using a plurality of temperature sensors;

detecting the one or more regions in which the thermal shading occurs based on a dark image that is captured; or detecting the one or more regions in which the thermal shading occurs by processing images captured by the CMOS image sensor using an artificial intelligence (AI) and/or machine learning.

14. The system as claimed in claim 9, wherein each of the plurality of heating elements comprises a resistor and a transistor connected to the resistor in series between a power supply and ground.

15. The system as claimed in claim 9, wherein automatically switching the subset of the plurality of heating elements to turn on is triggered in response to power consumption due to thermal resistance.

16. The system as claimed in claim 14, wherein the plurality of heating elements comprise a parallel connection of a plurality of branches, each of the plurality of branches comprising a resistor and a transistor connected to the resistor in series.

17. The system as claimed in claim 12, wherein the transistor is a metal-oxide-semiconductor field-effect transistor (MOSFET), and the controller is further configured to control switching of each of the plurality of heating elements by switching the MOSFET included in each of the plurality of heating elements.

18. The system as claimed in claim 9, wherein the plurality of heating elements further comprises a power consuming block comprising at least one of an inverter chain or a ring oscillator.

\* \* \* \* \*